Feb. 4, 1969  J. F. EBELING  3,425,079
REVERSIBLE MOUNT FOR A BRUSH
Filed Oct. 10, 1966  Sheet 1 of 2
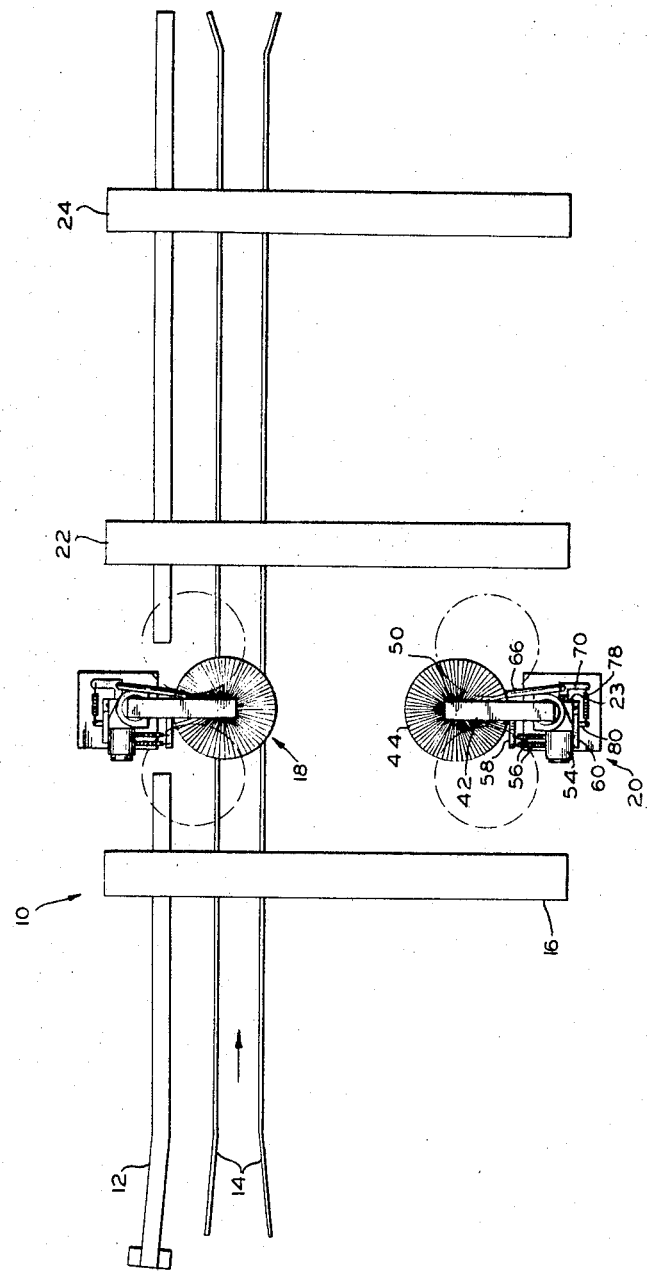
FIG. I
JACK F. EBELING
INVENTOR
BY
BUCKHORN, BLORE, KLARQUIST & SPARKMAN
ATTORNEYS

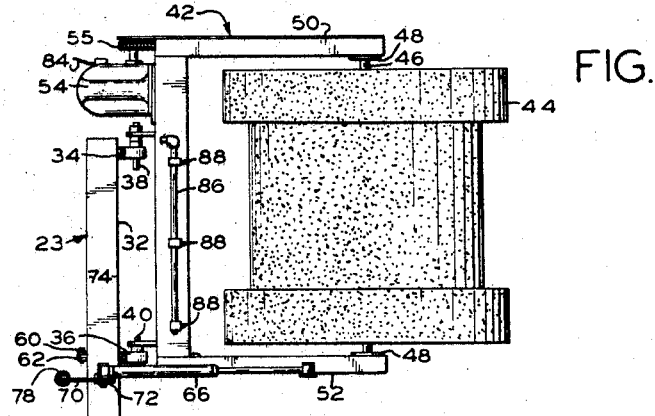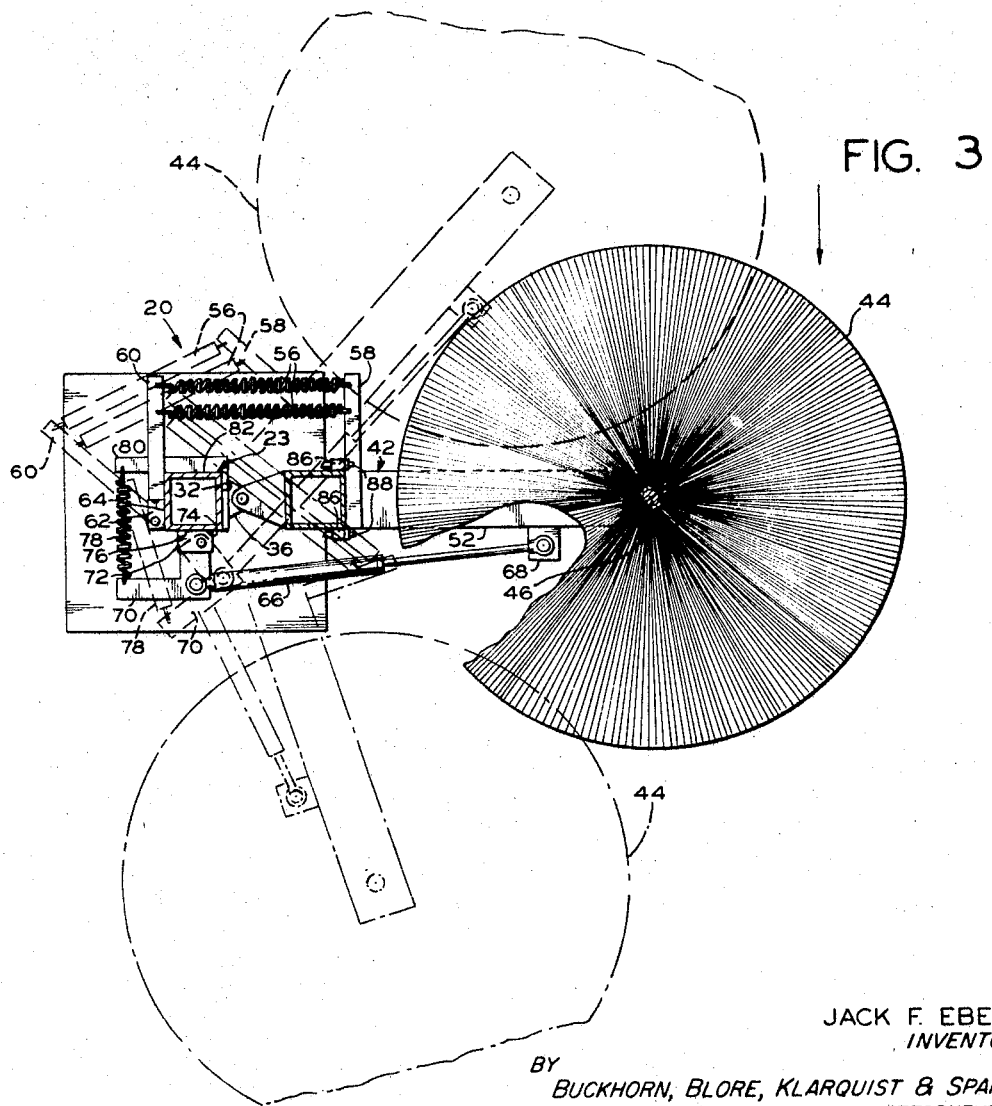

United States Patent Office 3,425,079
Patented Feb. 4, 1969

3,425,079
REVERSIBLE MOUNT FOR A BRUSH
Jack F. Ebeling, Portland, Oreg., assignor to
Daniel C. Hanna, Portland, Oreg.
Filed Oct. 10, 1966, Ser. No. 585,509
U.S. Cl. 15—21                 5 Claims
Int. Cl. A46b *13/02;* B60s *3/06*

ABSTRACT OF THE DISCLOSURE

A car washing apparatus includes brush structures 18 and 20 for washing the front and the sides of a car advanced along a track 14. Each brush structure includes a rotated brush 44 carried by a frame 42 normally held in a centered position by springs 56 acting in one direction and a dashpot 66 which is mounted on an arm 70 normally held by a stronger spring 78 in a position preventing rearward movement of the frame 42. When a car is backed into the brush, the arm 79 swings away from a stop 76 so that the brush structure is not damaged.

This invention relates to an improved car scrubbing brush structure, and more particularly to a car washing apparatus having a rotary brush carried by a reversible mount.

In coin operated car washing apparatus in which the driver of the car drives in a single direction through the apparatus, there have been provided in the past rotary brushes mounted in the path of the car which are spring biased into the path of the car and are swng by the car to the sides of the car. After the car has been moved past the brushes, the brushes are swung back into the path of the car at the rear of the car. These brushes effectively scrub the front and sides of the car but are subject to damage if the car is backed into the brushes which occasionally, inadvertently, occurs.

An object of the invention is to provide a new and improved car scrubbing brush structure.

Another object of the invention is to provide a car washing apparatus having a rotary brush carried by a reversible mount.

A further object of the invention is to provide a mount for a car scrubbing brush which permits the brush to be swung out of the path of the car when the car is moved either forwardly or rearwardly into engagement with the brush.

Another object of the invention is to provide a simple, rugged and effective reversible mount for a car scrubbing brush.

The invention provides a car scrubbing brush structure including a mount normally holding a brush in a position in the path of a car, permitting the brush to be swung out of the path of the car as the car is moved in the forward direction and also permitting the brush to be swung out of the path of the car when the car is moved in the reverse direction. Preferably the brush structure includes a post hingedly mounting an arm carrying a motor driven rotary brush for swinging movement either forwardly or rearwardly from a normal position in the path of a car which is normally moved forwardly but which, occasionally, is accidentally moved rearwardly, there preferably being provided a hinged member carrying one end of a dashpot secured to the arm and normally held by a strong spring against a stop to limit movement of the arm to the normal position thereof and adapted to be pulled away from the stop by the arm when a car is accidentally moved in the reverse direction against the brush.

A complete understanding of the invention may be obtained from the following detailed description of an improved car scrubbing brush structure forming a specific embodiment thereof, when read in conjunction with the appended drawings, in which:

FIG. 1 is a top plan view of a car washing apparatus including a car scrubbing brush structure forming one embodiment thereof;

FIG. 2 is an enlarged front elevation view of the brush structure of FIG. 1; and FIG. 3 is an enlarged horizontal sectional view of the brush structure of FIG. 1.

Referring now in detail to the drawings, a car washing apparatus 10 (FIG. 1) includes a signal device 12, which paces the travel of a car (not shown) along a guide track 14 seriatim, from left to right, as viewed in FIG. 1, to and past a soaping arch 16, brush structure 18 and 20 forming specific embodiments of the invention, a scrubbing arch 22 and a rinsing arch 24. As the car so travels, the soaping arch 16 applies hot, soapy water to the car, the brush structures 18 and 20 scrub the front and sides of the car, the scrubbing arch 22 scrubs the upwardly facing surfaces of the car, and the rinsing arch rinses the car with hot water.

The brush structures 18 and 20 are identical to each other except for being allochiral or handed relative to each other and only the brush structure 20 will be described in detail. The brush structure 20 includes a flanged mounting post 23 adapted to be bolted or otherwise secured to the floor in a vertical position at the right side of the path of the car through the apparatus. The post is square and carries on a face 32 thereof hinge brackets 34 and 36 (FIG. 2), which are adapted to receive hinge pins 38 and 40 fixed to a U-shaped frame or arm member 42 for swinging movement of the frame from a normal position shown in full lines in FIG. 3 to an extreme forward position shown in dot-dash lines or to an extreme rearward position shown in dash lines in FIG. 3. A rotary brush 44 mounted on a shaft 46 journaled in bearings 48 carried by hollow arms 50 and 52 is rotated by an electric motor drive 54 (FIG. 2) and a chain-and-sprocket transmission 55 extending through the hollow arm 50.

A pair of tension springs 56 (FIG. 3) are secured to a lug 58 rigidly mounted on the arm member 42 and to an arm 60 mounted pivotally on a bracket 62 fixed to a face 64 of the post. The springs 56 are of a predetermined combined strength, and urge the arm member 42 counterclockwise, as viewed in FIG. 3, toward the normal position thereof in which the brush is in the path of the car. A dashpot 66, for slowing the return of the arm member 42 from a forward position thereof to the normal position thereof, is pivotally secured at one end to a lug 68 fixed to the lower arm 52 of the arm member 42, and the dashpot is pivotally secured at its other end to one end of an L-shaped link 70, which is pivotally mounted at its outer end on a bracket 72 fixed to a face 74 of the post. The link normally is held against a stop 76 of the bracket 72 by a spring 78 fixed to the link and to a lug 80 rigidly fixed to a face 82 of the post and extending substantially beyond the face 64 of the post. The electric motor drive is supplied with power from a flexible electric cable 84, and a pipe 86 carrying nozzles 88 is connected by a flexible hose (not shown) to a source of water under pressure. The nozzles spray water on the brush.

During normal operation, the brush is held by the springs 58 in the path of the car. The car pushes the brush forwardly and to one side as the car is moved therepast from left to right, as viewed in FIGS. 1 and 3, the dashpot 66 being contracted freely. The brush is rotated and brushes the front and right side of the car. After the car clears the brush, the springs 58 swing the arm member 42 back to its normal position, the dashpot slowing the return. If the car is moved rearwardly into the brush, the spring 78 is overcome, the L-shaped link 70 is swung counterclockwise, as viewed in FIG. 3, and the pivot of the dashpot is swung out in front of the face 32 of the post to prevent binding between the dashpot and the arm 42. The arm 42 swings counterclockwise to avoid buckling of the springs 56. The spring 78 is close wound and pretensioned, and always exerts enough force to hold the L-shaped link 70 against the stop except when the brush 44 is pushed hard in the rearward direction from its normal position.

The above-described brush structures 18 and 20 serve to effectively scrub the front and sides of the car, and are freely swung to the rear when the car is backed into the brushes. The brush structures are rugged and durable while being simple and inexpensive in their construction.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a car washing apparatus,
brush means,
support means,
arm means,
means mounting the brush means on the arm means,
means mounting the arm means on the support means for movements forwardly and rearwardly from a normal position holding the brush means in the path of a car moved forwardly along a predetermined path,
and positioning means urging the arm means toward the normal position thereof and permitting movements of the arm means both forwardly and rearwardly of the normal position, the positioning means comprising:
a dashpot,
means securing one end of the dashpot pivotally to the arm means,
a link,
means securing the other end of the dashpot pivotally to the link,
means mounting the link pivotally on the support means,
a stop,
and means urging the link toward engagement with the stop and in a direction tending to extend the dashpot, the arm means being in the normal position when the dashpot is extended and the link is in engagement with the stop,
the arm means serving to contract the dashpot when swung in the forward direction from the normal position of the arm means.

2. In a car washing apparatus,
a vertical post positioned outside a predetermined path of a car moved in one direction along said path,
arm means mounted pivotally on a substantially vertical axis at the side of the post adjacent said path,
rotary brush means carried by the arm means,
first spring means urging the arm means in a rearward direction,
link means pivotally mounted on the post,
a dashpot connected to the link means and the arm means,
a stop,
and second spring means normally holding the link means against the stop and serving to permit the link means to swing around the post when the car is moved rearwardly against the brush means.

3. The car washing apparatus of claim 2 wherein the link means comprises an L-shaped link,
the link being pivotally connected at the free end of one arm thereof to the post and being pivotally connected at the juncture of the arms thereof to the dashpot,
the second spring means being a tension spring connected to the free end of the other arm of the link,
a lug connected to the post and to the other end of the tension spring,
the first spring means being tension spring means,
a lug connected to the arm means and to one end of the tension spring means of the first spring means,
and an arm pivotal on the post between predetermined limits and connected to the other end of the tension spring means.

4. In a car washing apparatus
brush means,
arm means mounting on one end thereof the brush means,
support means at one side of a path of a car and mounting the other end of the arm means pivotally for movement from a normal position extending into the path to a second position extending forwardly along the path and to a third position extending rearwardly along the path,
first resilient means of a predetermined strength urging the arm means rearwardly to the normal position thereof,
second resilient means stronger than the first resilient means serving to resist movement of the arm means rearwardly from the normal position thereof,
and an extensible positioning arm connected between said arm means and said second resilient means, said extensible positioning arm normally being fully extended by said first resilient means for determining the normal position of said arm means, said extensible positioning arm being compressible as said arm moves forwardly against the bias of said first resilient means,
said extensible positioning arm producing complete engagement between said arm means and said second resilient means, so that rearward movement of said arm means produces yieldable movement of said second resilient means, only when said extensible positioning arm is fully extended and said arm means is urged rearwardly.

5. In a car washing apparatus,
brush means,
arm means mounting on one end thereof the brush means,
support means at one side of the path of a car and mounting the other end of the arm means pivotally for movement from a normal position extending into the path to a second position extending forwardly along the path and to a third position extending rearwardly along the path,
first resilient means of a predetermined strength urging the arm means rearwardly to the normal position thereof,
and second resilient means stronger than the first resilient means serving to resist movement of the arm means rearwardly from the normal position thereof,
said second resilient means including a tension member attached at one end to the arm means, an arm attached pivotally to the support means, to the second resilient means and to the other end of the tension member, and stop means engaging the arm to limit movement of the arm in the direction in which the arm pulls the arm means forwardly to its normal position and permits the arm to move in a direction permitting the arm means to move rearwardly from its normal position.

References Cited
UNITED STATES PATENTS

| 2,318,996 | 5/1943 | Holmes | 15 |
| 2,381,054 | 8/1945 | Holmes | 15 |
| 3,090,981 | 5/1963 | Vani et al. | 15 |
| 3,187,359 | 6/1965 | Takeuchi | 15—21 |
| 2,910,202 | 10/1959 | Clarke et al. | 15 |

EDWARD L. ROBERTS, *Primary Examiner.*